(12) United States Patent
Thompson et al.

(10) Patent No.: US 9,484,728 B1
(45) Date of Patent: Nov. 1, 2016

(54) JOINER FOR CHANNEL RACEWAY ASSEMBLY

(71) Applicant: Cooper Technologies Company, Houston, TX (US)

(72) Inventors: Stephen Nathaniel Thompson, Edwardsville, IL (US); Martin Lee Witherbee, Godfrey, IL (US); Jacob Johnson, New Baden (IL)

(73) Assignee: Cooper Technologies Company, Houston, TX (US)

( * ) Notice: Subject to any disclaimer, the term of this patent is extended or adjusted under 35 U.S.C. 154(b) by 0 days.

(21) Appl. No.: 14/740,849

(22) Filed: Jun. 16, 2015

(51) Int. Cl.
*H02G 3/06* (2006.01)
*H02G 3/00* (2006.01)

(52) U.S. Cl.
CPC ..................... *H02G 3/263* (2013.01)

(58) Field of Classification Search
CPC ........................................................ H02G 3/263
USPC ................. 52/220.7, 843, 844, 848; 403/341
See application file for complete search history.

(56) References Cited

U.S. PATENT DOCUMENTS

| | | | |
|---|---|---|---|
| 2,741,499 A | 4/1956 | Kussmaul | |
| 3,471,629 A * | 10/1969 | O'Leary | H02G 3/185 138/115 |
| 4,283,157 A * | 8/1981 | Kowalski | F16B 7/0446 403/297 |
| 4,305,677 A * | 12/1981 | Kowalski | F16B 7/04 403/205 |
| 4,682,457 A * | 7/1987 | Spencer | E04B 2/7425 52/220.7 |
| 5,067,678 A * | 11/1991 | Henneberger | H02G 3/0608 248/58 |
| 5,095,678 A * | 3/1992 | Murphy | E04C 3/07 52/844 |
| 5,271,204 A * | 12/1993 | Wolf | A47B 96/1458 52/836 |
| 5,390,968 A | 2/1995 | Favalora | |
| 5,752,781 A * | 5/1998 | Haataja | G02B 6/4459 403/300 |
| 5,753,855 A | 5/1998 | Nicoli et al. | |
| 5,927,041 A * | 7/1999 | Sedlmeier | E04B 9/064 248/49 |
| 6,143,984 A * | 11/2000 | Auteri | H02G 3/0608 174/101 |
| 6,158,180 A * | 12/2000 | Edwards | E04B 2/7422 174/481 |
| 6,424,779 B1 * | 7/2002 | Ellison | G02B 6/4459 385/134 |
| 6,660,938 B2 * | 12/2003 | Herb | E04C 3/07 174/101 |
| 6,715,719 B2 * | 4/2004 | Nault | H02G 3/0608 248/49 |
| 6,759,589 B1 * | 7/2004 | VanderVelde | A47B 21/06 174/481 |

(Continued)

*Primary Examiner* — James Buckle, Jr.
(74) *Attorney, Agent, or Firm* — Senniger Powers LLP

(57) ABSTRACT

A joiner system for a channel raceway includes a joiner body with first and second posts, and a joiner wall panel separate from the joiner body. The joiner wall panel connects to the joiner body between the first and second posts to form a wall between the first and second posts. First and second connecting projections extend outward from adjacent the respective first and second posts. The first and second connecting projections are spaced apart from one another and in generally opposing relationship with respect to one another. The joiner body has a snap-fit component on the lower side of a base of the joiner body. The snap-fit component mates in a snap-fit connection with a splice plate to interconnect the joiner body and at least two pieces of channel framing.

13 Claims, 14 Drawing Sheets

(56) References Cited

U.S. PATENT DOCUMENTS

| | | |
|---|---|---|
| 6,805,514 B2 | 10/2004 | Buard |
| 7,226,022 B2 | 6/2007 | Bernard et al. |
| 7,922,129 B2 | 4/2011 | Rapp et al. |
| 8,015,767 B2* | 9/2011 | Glick .................... E04B 2/7425 52/220.7 |
| 8,083,187 B2 | 12/2011 | Bernard et al. |
| 8,959,859 B2* | 2/2015 | Haan ..................... E05B 65/006 52/205 |
| 2002/0096606 A1* | 7/2002 | Bernard ............... H02G 3/0608 248/68.1 |
| 2003/0159397 A1* | 8/2003 | Birnbaum ................ E04C 3/07 52/843 |
| 2005/0129458 A1* | 6/2005 | Hoffmann ............... F16B 7/187 403/256 |
| 2005/0178571 A1* | 8/2005 | McCarthy ................ F16L 3/26 174/481 |
| 2005/0224293 A1* | 10/2005 | Molnar ................ B66B 9/0846 187/200 |
| 2007/0044988 A1 | 3/2007 | VanderVelde et al. |
| 2014/0260083 A1* | 9/2014 | Zhang ................ F16B 37/0885 52/843 |

* cited by examiner

US 9,484,728 B1

JOINER FOR CHANNEL RACEWAY ASSEMBLY

FIELD OF THE DISCLOSURE

The present disclosure generally relates to a joiner for joining pieces of channel framing, and a channel raceway assembly including the joiner.

BACKGROUND

Raceways are used to house and manage wire and cables within an electrical system, for example. One type of raceway is called a channel raceway. This type of raceway includes pieces of channel framing, e.g., strut, connected to one another by junctions, also called joiners. Open slots of the pieces of channel framing are covered so that the wires and/or cables are enclosed within the raceway.

SUMMARY OF THE DISCLOSURE

In one aspect, a joiner system for a channel raceway generally comprises a joiner body including a base and first and second posts extending upward from the base. The first and second posts are spaced apart from one another and in generally opposing relationship with respect to one another. A joiner wall panel is separate from the joiner body. The joiner body and the joiner wall panel are configured to facilitate selective connection of the joiner wall panel to the joiner body between the first and second posts to form a wall between the first and second posts.

In another aspect, a joiner for a channel raceway generally comprises a joiner body including a base. First and second posts extend upward from the base. The first and second posts are spaced apart from one another and in generally opposing relationship with respect to one another. First and second connecting projections extend outward from adjacent the respective first and second posts. The first and second connecting projections are spaced apart from one another and in generally opposing relationship with respect to one another.

In yet another aspect, a joiner for a channel raceway generally comprises a joiner body including a base having an upper side and a lower side. The joiner body is connectable to at least two pieces of channel framing to form the channel raceway. A snap-fit component on the lower side of the base of the joiner body is configured to mate in a snap-fit connection with a splice plate to interconnect the joiner body and said at least two pieces of channel framing.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
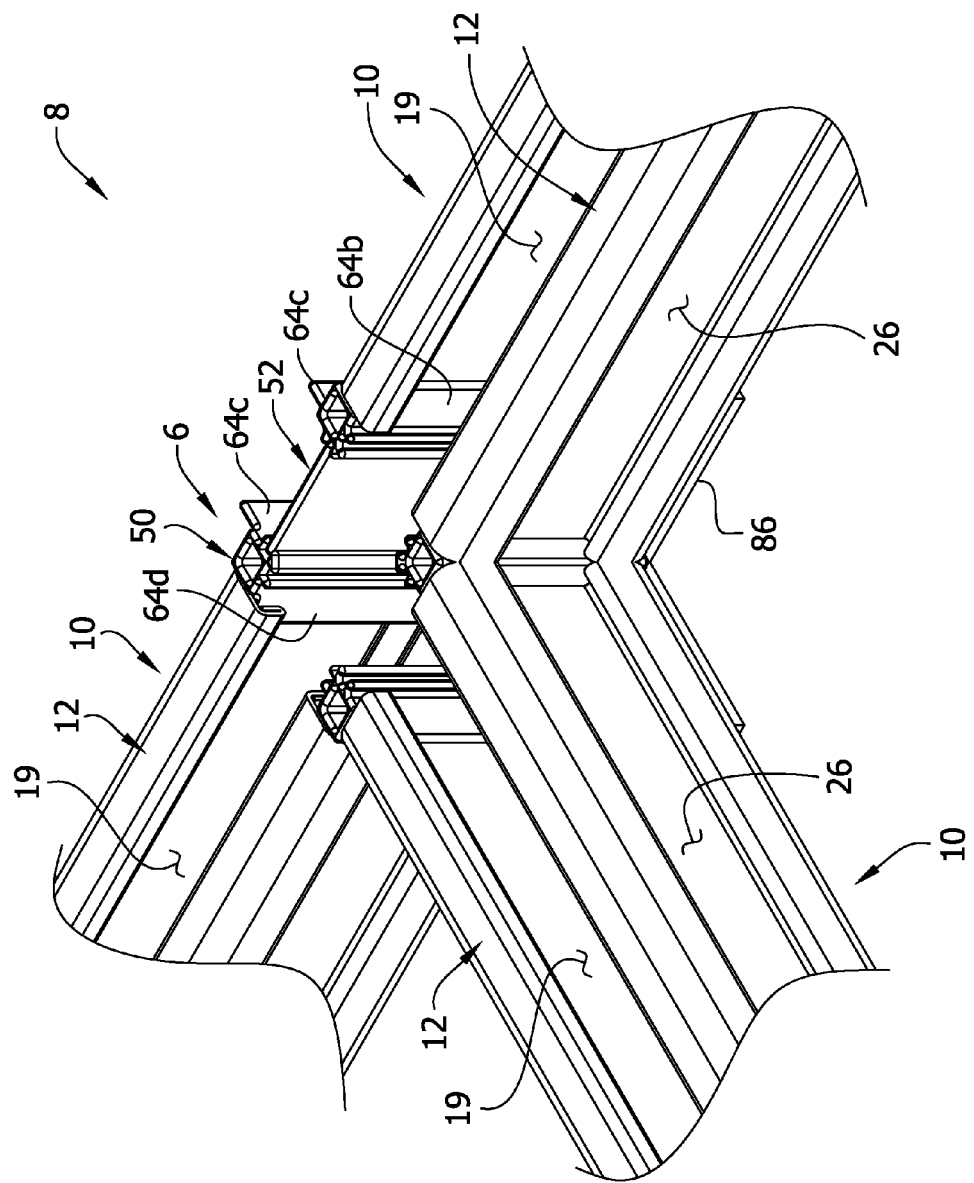
FIG. 1 is an enlarged, partial perspective of a channel raceway assembly including a joiner of the present disclosure configured as a tee joiner.

Referring to FIG. 1, the present disclosure is directed to a joiner, generally indicated at reference numeral 6, and a channel raceway assembly, generally indicated at 8, including the joiner. The joiner 6 is used to connect pieces of channel framing, each generally indicated at 10, to one another to form the channel raceway assembly 8. As explained in more detail below, the joiner 6 is configurable to different configurations (e.g., elbow joiner, tee joiner, and cross joiner) for interconnecting two, three, or four pieces of channel framing 10 to form the channel raceway assembly 8. In the embodiment illustrated in FIG. 1, the joiner 6 is configured as a tee joiner. The joiner 6 may be configurable at the job site, or prior to delivery to the job site, to any one of the different configurations.

Figure 2:
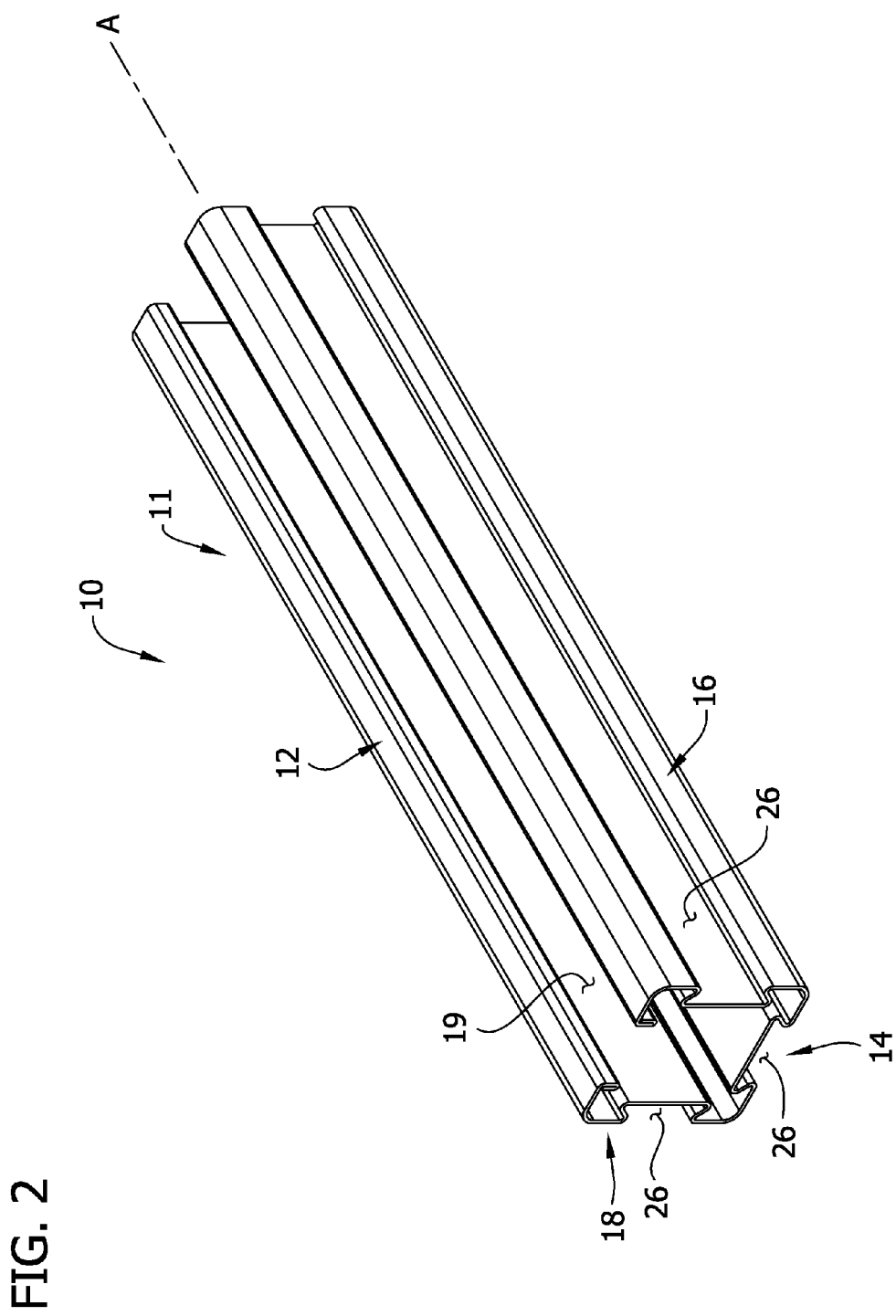
FIG. 2 is a front perspective of one embodiment of channel framing of the channel raceway assembly.
Figure 3:
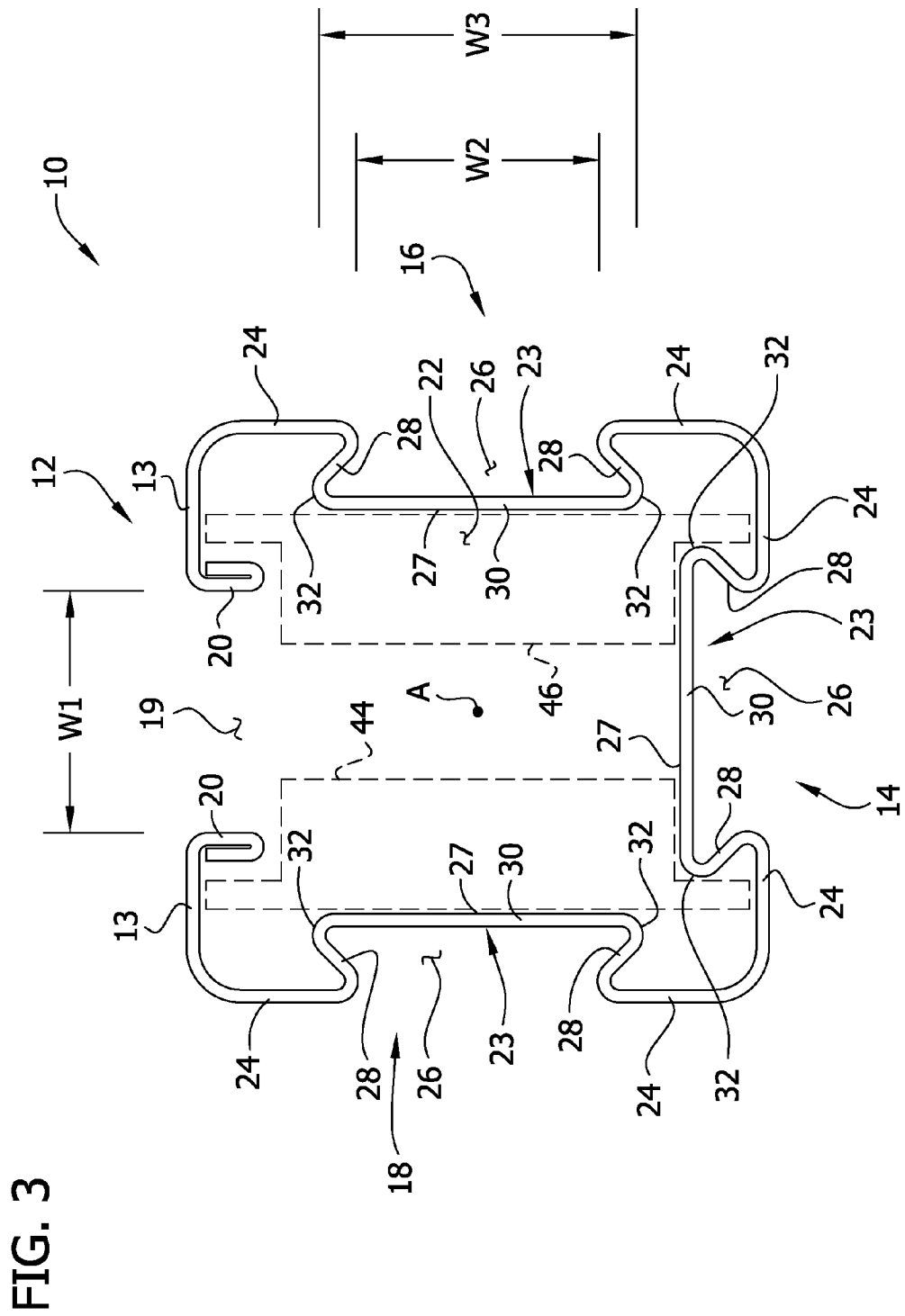
FIG. 3 is a front elevation of the channel framing, with left and right tracks defined by an interior of the channel framing being shown in broken lines.

Referring to FIGS. 2 and 3, the illustrated channel framing 10 is elongate with a generally square or rectangular cross-sectional shape having four sides and a longitudinal axis A extending along its length. As illustrated, the body 11 of the framing 10 has an upper side 12, a lower side 14, a right side 16, and a left side 18 (each indicated generally). As used throughout the present disclosure with respect to the channel framing 10 and the joiner 6, the terms defining relative locations and positions of structures and components thereof, including but not limited to the terms "upper," "lower," "right," "left," "top," and "bottom," are meant to provide a point of reference for such components and structures as shown in the drawings, with the understanding that the respective relative locations of such components and structures will depend on the orientation of the channel framing and joiner in use. Moreover, the terms "inner" and "outer" as used in reference to the channel framing 10 are relative locations with respect to the longitudinal axis A of the channel framing. The upper side 12 (or slot side) defines a continuous opening or slot 19 (i.e., the upper side is open) having a width W1 (FIG. 3). The upper side 12 has outer portions 13 on either side of the slot 19, and inturned (or downwardly extending, as illustrated) lips 20 defining the slot and leading to an open interior 22 of the channel framing 10.

As illustrated, each of the lower, right and left sides 14, 16, 18, respectively, of the channel framing 10 has an inward portion, generally indicated at 23, and opposite outer portions 24 on either side of the inward portion, extending lengthwise of channel framing 10. An exterior of the inward portion 23 defines an external fitting groove 26, and an interior surface of the inward portion defines an internal rail 27. Thus, the illustrated channel framing 10 includes respective left, right, and lower fitting grooves 26 and corresponding left, right, and lower internal rails 27. Each inward portion 23 includes opposing side walls 28 extending generally inwardly from the respective ones of the outer portions 24 of the corresponding side 14, 16, 18. The side walls 28 extend to a planar inner wall 30 that spans between and interconnects the side walls. The side walls 28 flare away from one another as they extend inward from the outer portions 24 toward the inner wall 30 so that each inward portion 23 has a generally dovetail cross-sectional shape or longitudinal end profile. It is understood that the inner portion 23, including one or both of the fitting groove 26 and the internal rail 27, may be of other shapes and configurations without departing from the scope of the present disclosure.

Referring still to FIGS. 2 and 3, the fitting grooves 26 are substantially identical to one another. Each fitting groove 26 has a generally dovetail-shaped profile with a first relatively narrower width W2 (e.g., a minimum width) adjacent its entrance and a second relatively wider width W3 (e.g., a maximum width) adjacent the inner wall 30. As explained in more detail below, the fitting grooves 26 are used for securing a fitting to the channel framing 10. Examples of suitable fittings and use of the fittings are disclosed in U.S. patent application Ser. No. 13/966,897, filed Aug. 14, 2014, the entirety of which is hereby incorporated by reference. Other fittings may also be used.

As shown in FIG. 3, each rail 27 has a generally dovetail-shaped profile with opposite internal shoulders 32 at the junctions of the inner wall 30 and the side walls 28. Accordingly, the left and right rails 27 have upper and lower internal shoulders 32, as illustrated, and the lower rail 27 has left and right internal shoulders 32, as illustrated. The open interior 22 of the channel framing 10, including the rails 27, defines at least one track in which a fitting can be inserted for use in positioning the fitting at a desired location along the length of the channel framing, as explained in more detail below. In the illustrated embodiment the interior of the channel framing defines four (4) separate tracks, each of which has an effective T-shape in cross section (i.e., a "T-shaped track"). FIG. 3 includes a general outline (shown in broken line) of both a first channel framing track 44 (e.g., a left channel framing track), defined by the left interned lip 20, the inner face (defined by the inner wall 30) of the left internal rail 27, and the left shoulder and inner face (defined by the inner wall 30) of the lower internal rail; and a second channel framing track 46 (e.g., a right channel framing track) defined by the right inturned lip 20, the inner face (defined by the inner wall 30) of the right internal rail 27, and the right shoulder and inner face (defined by the inner wall 30) of the lower internal rail. There are also a third channel framing track (e.g., an upper channel framing track), defined by the inturned lips 20, and the upper shoulders 32 and inner faces (defined by the inner walls 30) of the respective left and right internal rails; and a fourth channel framing track (e.g., a lower channel framing track), defined by the lower shoulders 32 and inner faces (defined by the inner walls 30) of the respective left and right internal rails 27, and the inner face (defined by the inner wall 30) of the lower internal rail.

In one example, the channel framing 10 may be formed from a sheet of rigid metal, such as low carbon steel, stainless steel, aluminum, or other metals, or from other material, such as fiberglass or plastic. The channel framing 10 may be cold formed using a rolling mill, such as when forming the channel framing from steel, or the channel framing may be extruded from an extrusion die, such as when forming the channel framing from aluminum. The channel framing 10 may be formed in other ways. The channel framing 10 may be formed from a metal sheet having uniform thickness from about 0.5 mm to about 4 mm. In one non-limiting example, the channel framing 10 may be formed from 18 gauge (1.2 mm) steel sheet metal, or from 20 gauge (0.9 mm) steel sheet metal. In another non-limiting embodiment, the dimension of each of the width and height of the channel framing 10 may be 53.5 mm, as opposed to 50 mm.

It is understood that in other embodiments, the channel framing may be of other configurations without departing from the scope of the present invention.

Referring to FIGS. 4-8, the joiner 6 includes a joiner body, generally indicated at 50, and one or more joiner wall panels, generally indicated at 52 (FIG. 6), that are attachable to the joiner body. In essence, the illustrated joiner 6 is a joiner system. The joiner body 50 includes a floor or base 56 having four sides 58a, 58b, 58c, 58d generally defining a rectangular (or square) profile. Posts, 60a, 60b, 60c, 60d, extend upward from the base adjacent corners of the base, such that the joiner body 50 includes four posts in total. Each post 60a, 60b, 60c, 60d has a generally rectangular cross section (e.g., square cross section), although the posts may be of other shapes. The posts 60a, 60b, 60c, 60d are also hollow, although the posts may be solid. The posts 60a, 60b, 60c, 60d may be of other configurations without departing from the scope of the present invention.

Figure 4:
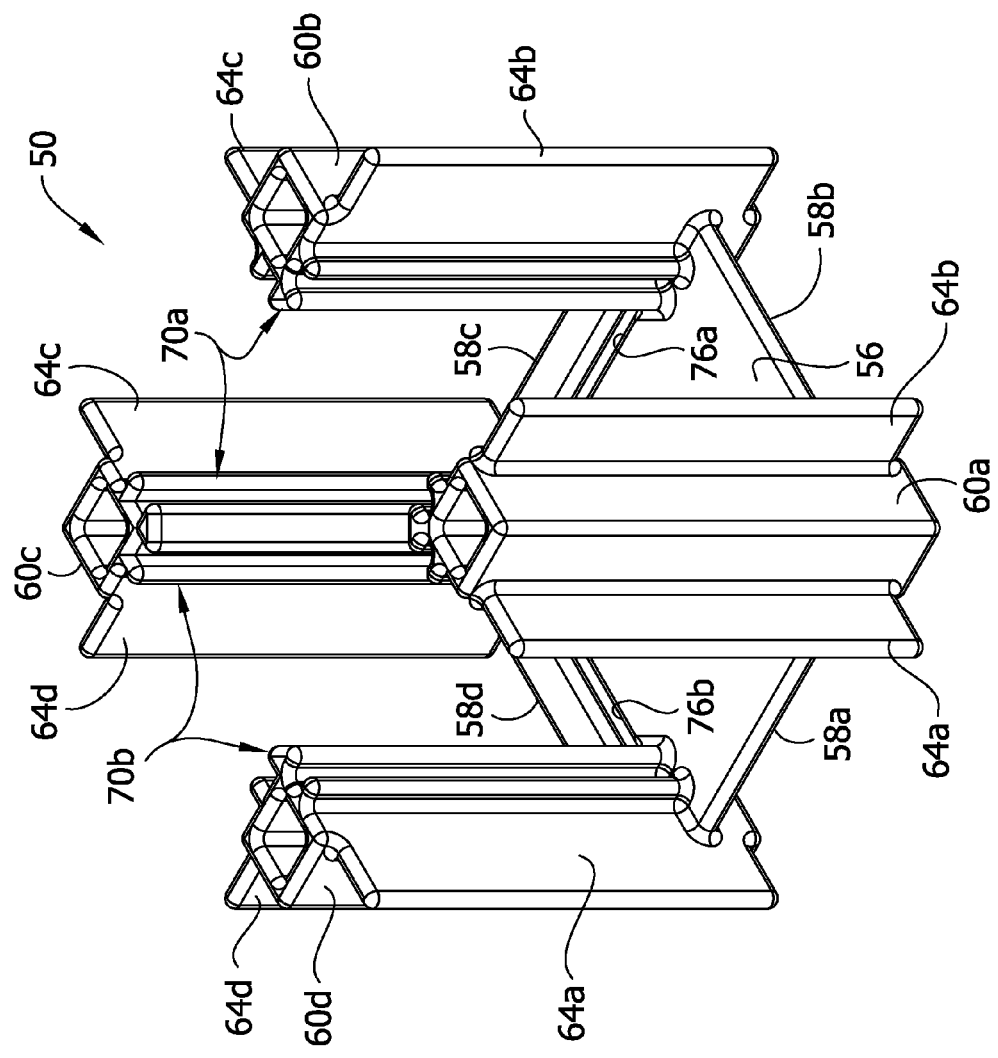
FIG. 4 is a top perspective of a joiner body of the joiner of FIG. 1.
Figure 5:
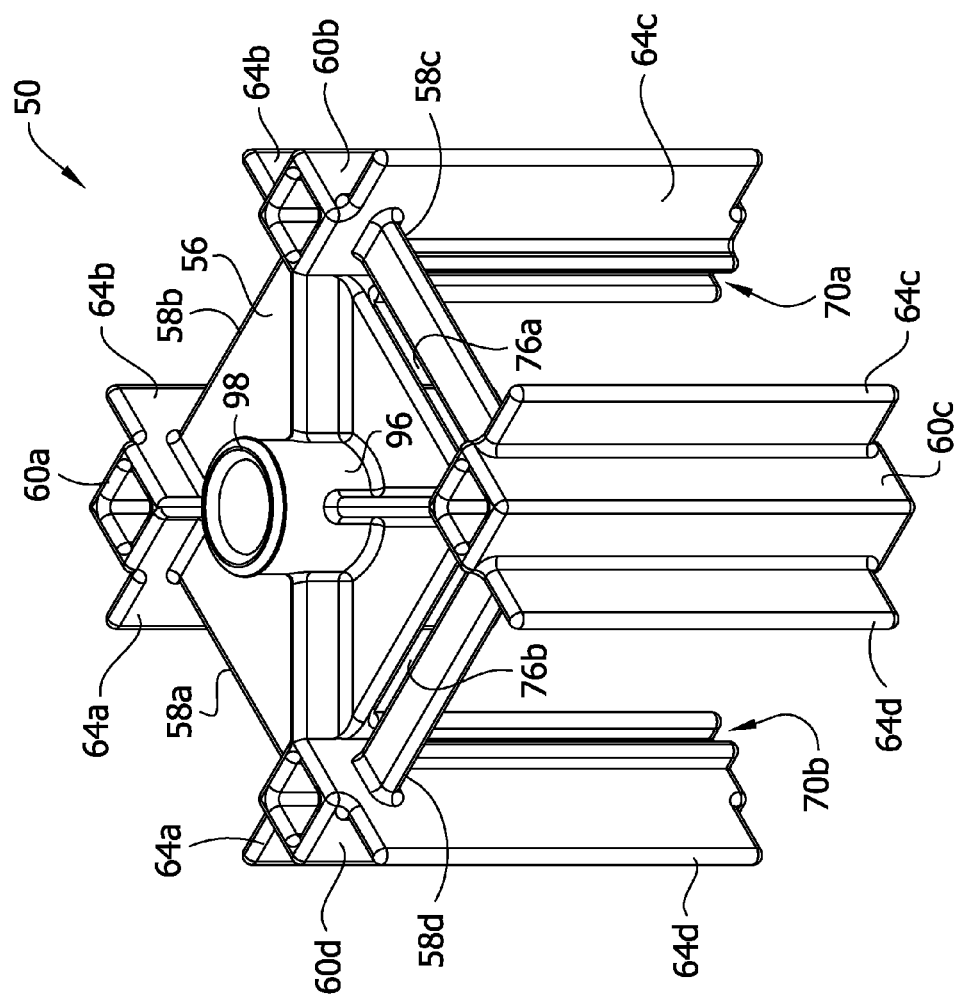
FIG. 5 is a bottom perspective of the joiner body.
Figure 6:
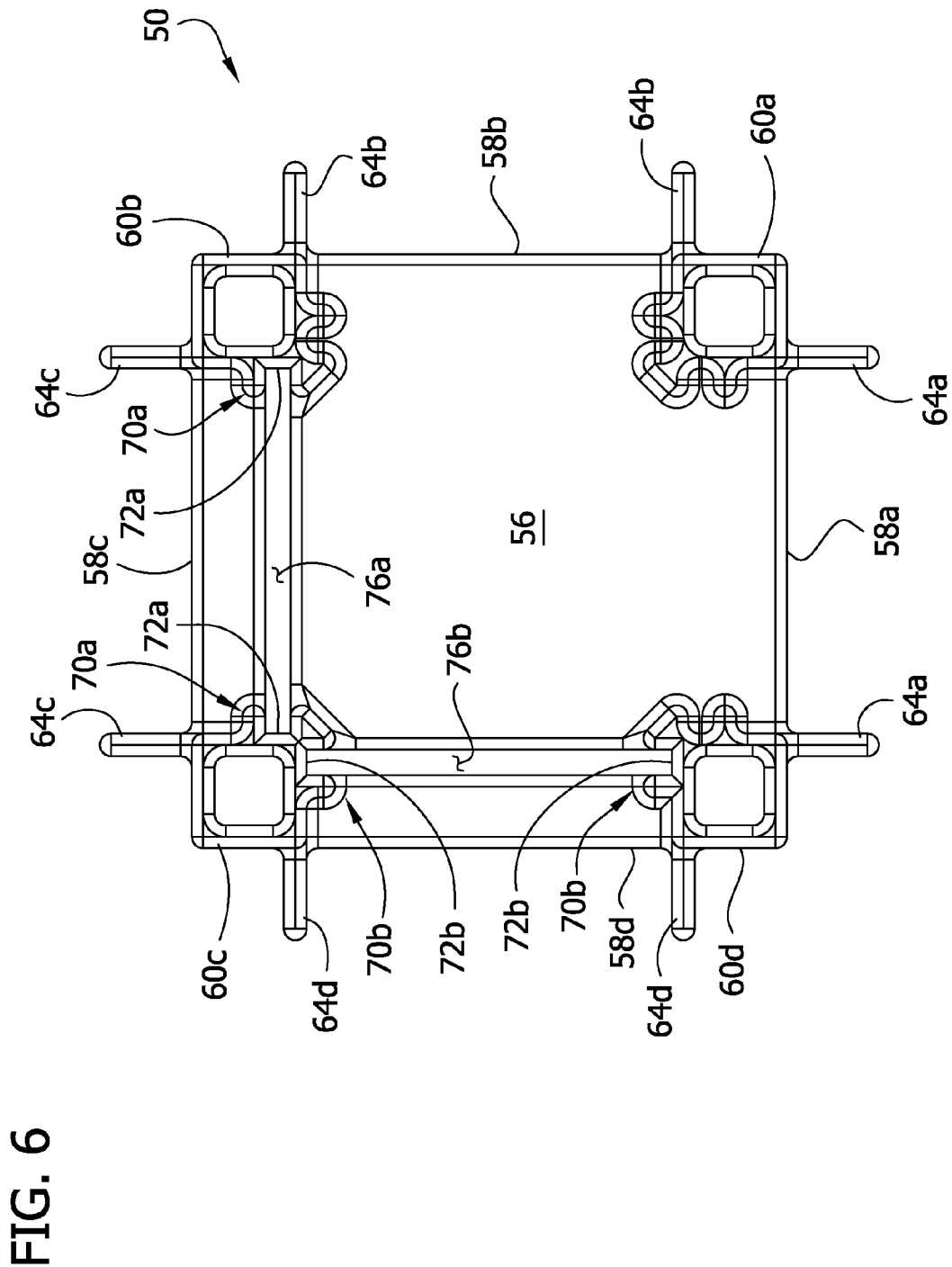
FIG. 6 is a top plan view of the joiner body.

Referring to FIGS. 4-6, the joiner body 50 also includes pairs of connecting projections 64a, 64b, 64c, 64d extending outward from each side of the base a distance d1. Each connecting projection in same connecting projection pair 64a, 64b, 64c, 64d is indicated by the same reference numeral. The connecting projections 64a, 64b, 64c, 64d of a corresponding pair are generally adjacent to adjacent corners, such that the connecting projections of each pair are spaced apart from one another along a corresponding side 58a, 58b, 58c, 58d and in generally opposing relationship with one another. The illustrated paired connecting projections 64a, 64b, 64c, 64d have lengths extending vertically along corresponding the posts 60a, 60b, 60c, 60d, and in the illustrated embodiment, each connecting projection is connected to and extends from one of the posts, such that each post has two connecting projections connected thereto. In the illustrated embodiment, upper and lower ends of each connecting projection 64a, 64b, 64c, 64d are recessed longitudinally (or undercut) relative to the respective upper and lower ends of the corresponding post 60a, 60b, 60c, 60d. The connecting projections 64a, 64b, 64c, 64d are sized and shaped for insertion into the channel framing tracks 44, 46 of the channel framing 10, such that the connecting projections function as inserts. Thus, the connecting projections 64a, 64b, 64c, 64d of each pair are insertable into opposing channel framing tracks 44, 46 of a piece of channel framing 10 to facilitate proper alignment of the joiner 6 with the channel framing. In the illustrated embodiment, the connecting projections 64a, 64b, 64c, 64d, which are in the form of flanges, are insertable into cross-wise portions of the channel framing tracks.

Figure 14:
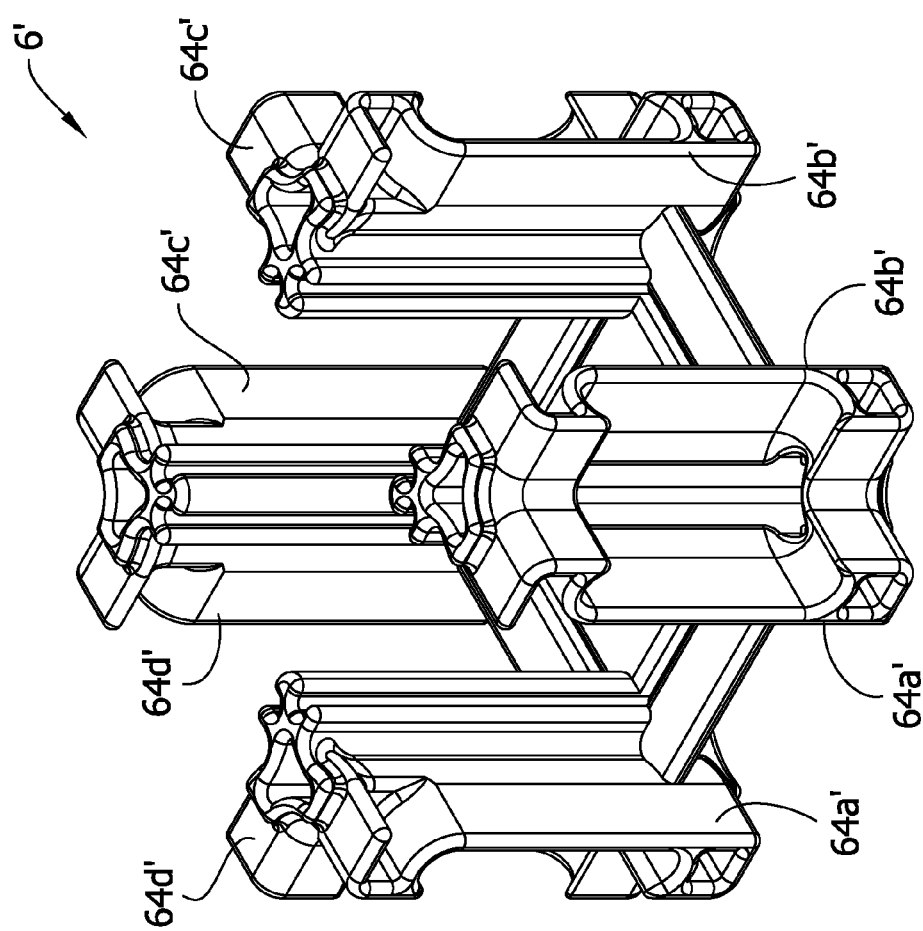
FIG. 14 is yet another embodiment of a joiner of the present disclosure.

In other embodiments, the connecting projections 64a, 64b, 64c, 64d may be of other designs, shapes and sizes to facilitate insertion into the channel framing tracks 44, 46 and connection to the channel framing 10. For example, referring to FIG. 14, another embodiment of a joiner body, generally indicated at 6" may be substantially similar to the first joiner body 6, except that connecting projections 64a', 64*b*', 64*c*', 64*d*' are of different shapes compared to the connecting projections 64*a*, 64*b*, 64*c*, 64*d*. In particular, the illustrated connecting projections 64*a*', 64*b*', 64*c*', 64*d*' are contoured or shaped to fit within the channel framing tracks 44, 46, including snugly within triangular-shaped corner portions of the tracks, of the channel framing 10. Thus, the illustrated connecting projections 64*a*', 64*b*', 64*c*', 64*d*' have shapes and sizes that generally correspond to at least portions of the channel framing tracks. The connecting projections 64*a*', 64*b*', 64*c*', 64*d*' may have other shapes and sizes without departing from the scope of the present invention.

Referring still to FIGS. 4-6, the joiner body 50 further includes at least one wall panel track 70*a*, 70*b* for slidably receiving the joiner wall panel 52 to facilitate interconnection of the joiner body and the joiner wall panel. In the illustrated embodiment, the joiner body 50 includes the first wall panel track 70*a* at the side 58*c*, and a second wall track at the side 58*d*. In other embodiments, the joiner body 50 may include any suitable number of wall panel tracks for receiving any suitable number of the joiner wall panels 52. For example, the joiner body 50 may include four wall panel tracks for selectively slidably receiving four respective joiner wall panels 52. In another example, the joiner body 50 may include three wall panel tracks for selectively slidably receiving three respective joiner wall panels 52. Other examples do not necessarily depart from the scope of the present invention. Each wall panel track 70*a*, 70*b* has opposing portions defining spaced apart, opposing grooves 72*a*, 72*b* extending upward from the base 56 of the joiner body 50. In the illustrated embodiment, each track 70*a*, 70*b* is connected to and extends along adjacent posts 60*b*, 60*c*, 60*d* and is configured to slidably receive one of the joiner wall panels 52 so that the joiner wall panel is connected to the joiner body 50 between the adjacent posts. For example, the track 70*a* extends along posts 60*b* and 60*c*, and track 70*b* extends along posts 60*c* and 60*d*. For each track 70*a*, 70*b*, a wall panel slot 76*a*, 76*b*, respectively, extending through the base 56 is in communication with the opposing grooves 72*a*, 72*b* defined by the corresponding wall track. Thus, the wall panel slot 76*a* is in communication with grooves 72*a*, and wall panel slot 76*b* is in communication with grooves 72*b*.

Figure 7:
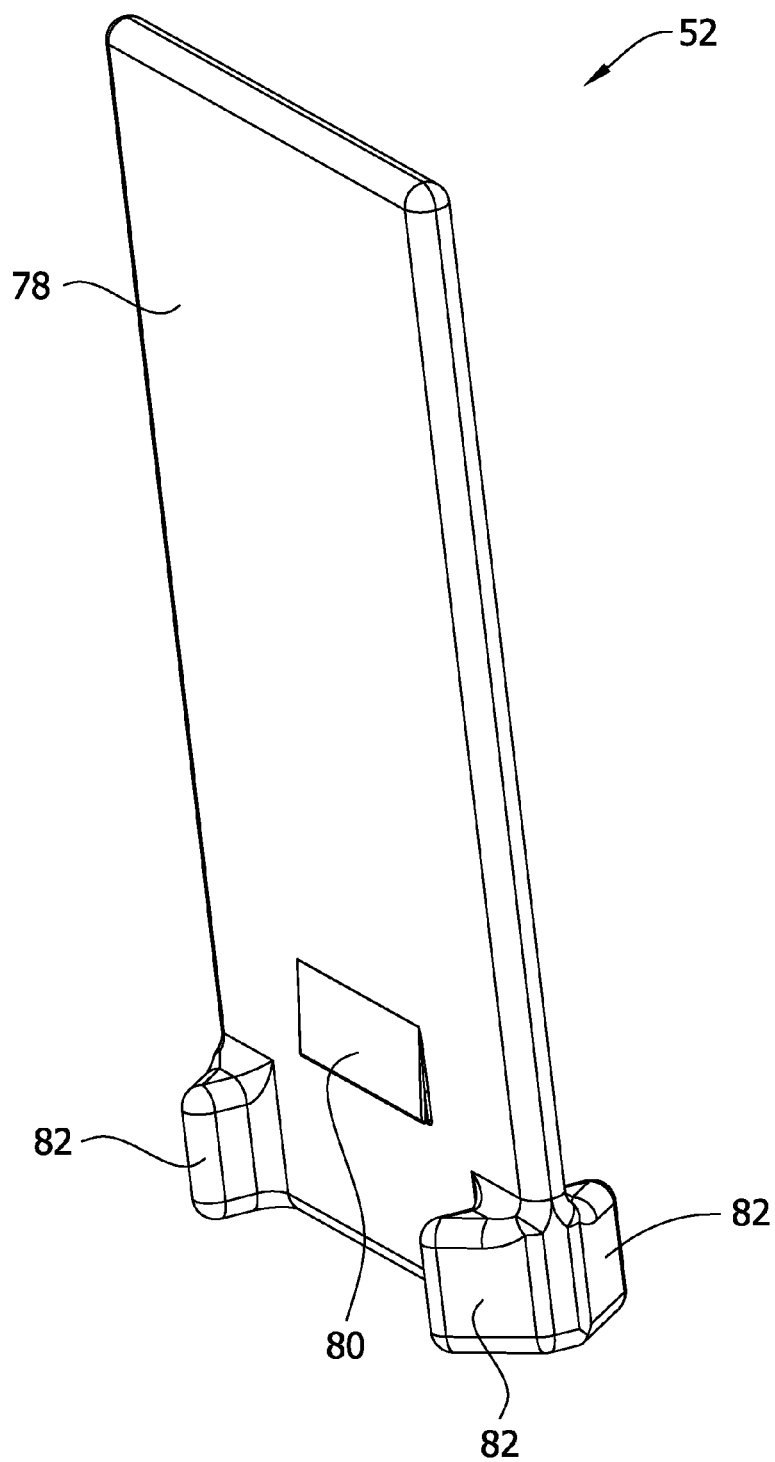
FIG. 7 is a perspective of a joiner wall panel of the joiner, the joiner being separated from the joiner body.

Referring to FIG. 7, the joiner wall panel 52 includes a panel body 78, which may have generally planar, rectangular shape, and at least one snap-fit component 80 (i.e., panel snap-fit component) to facilitate connection of the joiner wall panel to the joiner body 50. In the illustrated embodiment, the snap-fit component 80 comprises a snap-fit projection extending outward from a face of the panel body 78 adjacent a lower end of the panel body. In the illustrated embodiment, two snap-fit projections 80 extend from either face of the panel body 78, although only one snap-fit projection is visible in the Figures. The snap-fit component may be of other configurations for connection with the joiner body 50. At least one foot 82 extends outward from one or both faces of the panel body 78 at the lower end of the panel body. As explained in more detail below, the foot 82 may be referred to as a stop because of its function, and may have other configurations. In the illustrated embodiment, the joiner wall panel 52 includes four feet 82: two feet extending outward from each face of the panel body 78 adjacent opposite sides of the panel body. The joiner wall panel 52 may be of other configurations without departing from the scope of the present invention.

Figure 8:
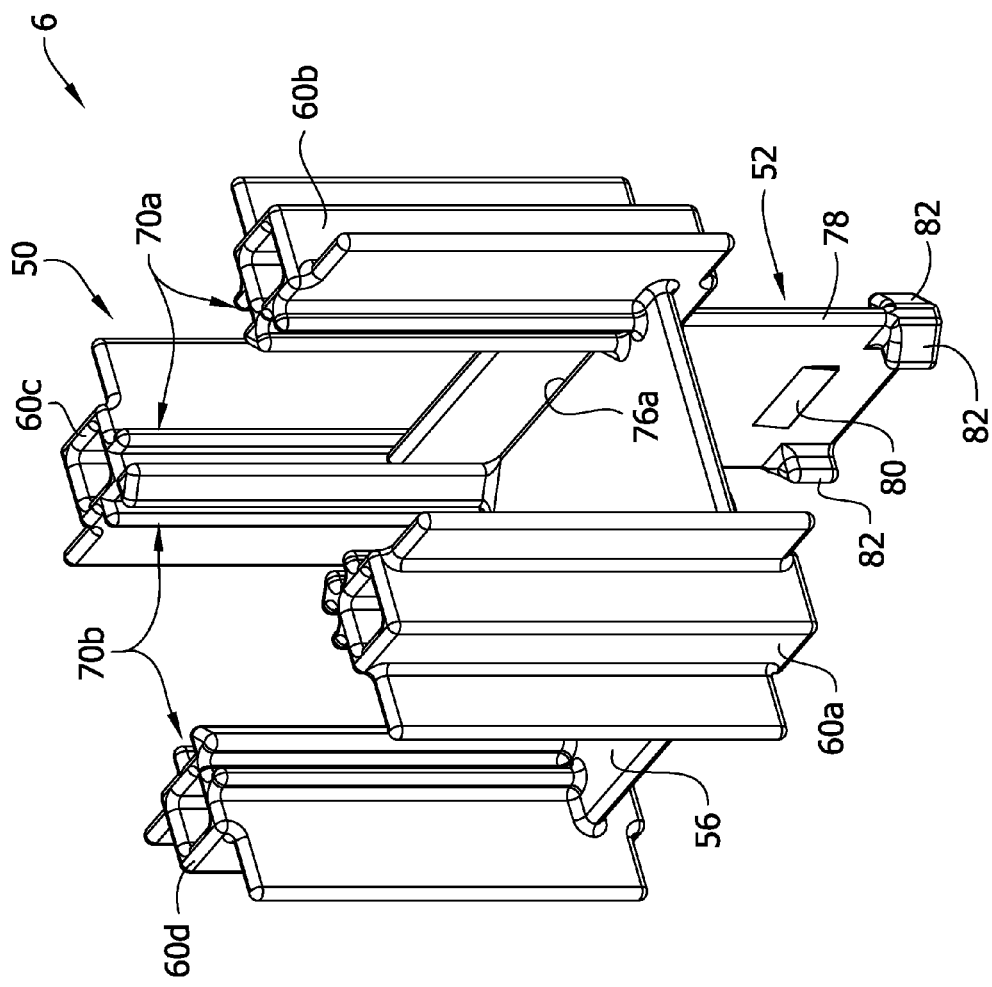
FIG. 8 is a top perspective illustrated the joiner wall panel being inserted into wall track of the joiner body.
Figure 9:
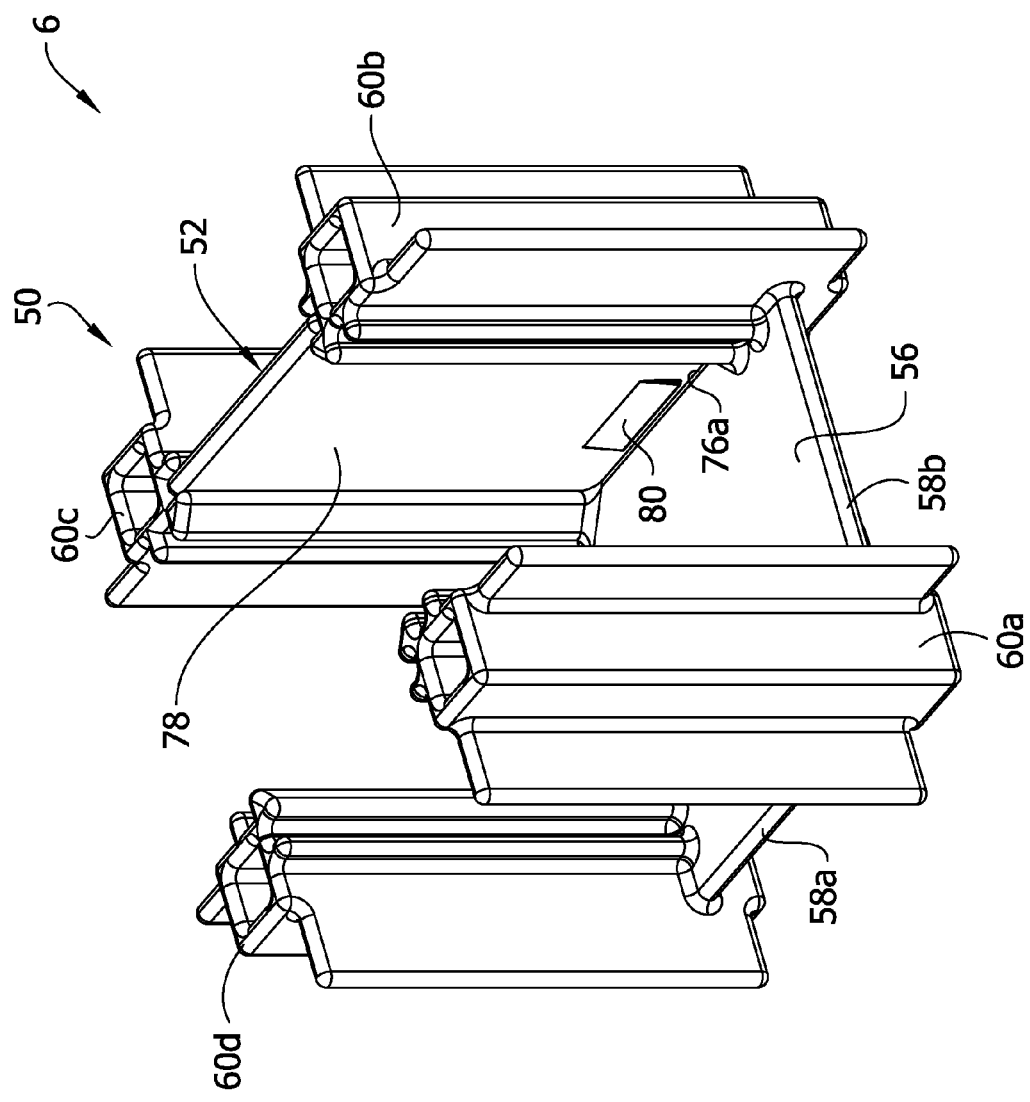
FIG. 9 is a top perspective of the joiner, with the joiner wall panel connected to the joiner body.

Referring to FIGS. 8 and 9, one or more joiner wall panels 52 are attached to the joiner body 50 by inserting an upper end of the one or more joiner wall panels into one or more of the wall panel slots 76*a*, 76*b*, through the bottom of the base 56. In the embodiment shown in FIGS. 8 and 9, a single joiner wall panel 52 is shown being connected to the joiner body 50, with the understanding that in other embodiments any number of joiner wall panels may be connected to the body in the same manner. Opposite sides of the joiner wall panel 52 slide into the respective grooves 72*a* of the wall track 70*a* as the joiner wall panel being inserted through the wall panel slot 76*a*. The joiner wall panel 52 is slidably advanced upward within the wall track 70*a* to connect the joiner wall panel to the joiner body 50 by a snap-fit connection. In particular, the joiner wall panel 52 is advanced until the one or more snap-fit projections 80 (broadly, a snap-fit component) on the joiner wall panel passes through the wall panel slot 76*a* (e.g., clears the upper surface of the base 56), as shown in FIG. 9. The snap-fit projection 80 resiliently deflects (and/or the base 56 may resiliently deflect) as the snap-fit projection enters the wall panel slot 76*a*. Upon exiting the wall panel slot 76*a*, the snap-fit projection 80 resiliently rebounds (and/or the base 56 resiliently rebounds). In this locked position, the snap-fit projection 80 will catch on the upper surface of the base 56 to resist or inhibit the joiner wall panel 52 from withdrawing from the track 70*a* and the wall panel slot 76*a* and disconnecting from the joiner body 50. This snap-fit connection may be inseparable (meaning the connection must break to be disconnected) or separable (meaning some amount of force will resiliently deflect one or both of the snap-fit projection and the base to allow the joiner wall panel 52 to be withdrawn from the track 70*a*). As attached, the feet 82 at the lower end of the joiner wall panel 52 inhibits the lower end of the joiner wall panel from passing through the wall panel slot 76*a* to restrict the upward advancement of the joiner wall panel along the wall track 70*a*. Moreover, the feet 82 are received between lower ends of the adjacent posts 60*b*, 60*c* and further restrict side to side movement of the joiner wall panel 52. When connected to the joiner body 50, the joiner wall panel 52 extends between and interconnects the adjacent posts 60*b*, 60*c* and forms a wall of the joiner. The upper end of the joiner wall panel lies substantially within the same plane as the upper ends of the posts 60*b*, 60*c*, and the lower end of the joiner wall panel lies substantially within the same plane as the lower ends of the posts. It is understood that the joiner wall panel(s) 52 may be connected or attached to the joiner body 50 in other ways without departing from the scope of the present invention. In the illustrated embodiment, the joiner wall panel(s) is connectable to the joiner body 50 without the use of additional fasteners, such as screws, bolts, or other mechanical fasteners.

Figure 10:
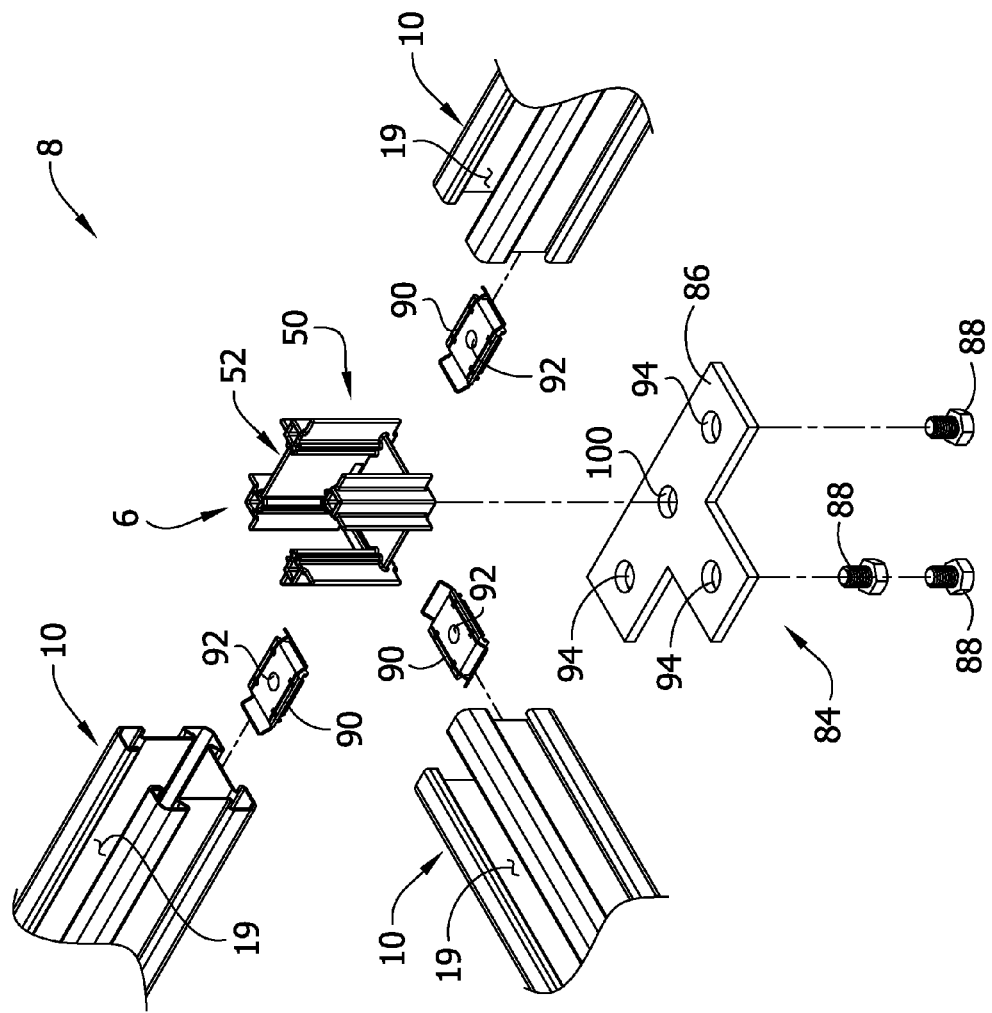
FIG. 10 is an exploded perspective of the channel raceway assembly of FIG. 1.
Figure 11:
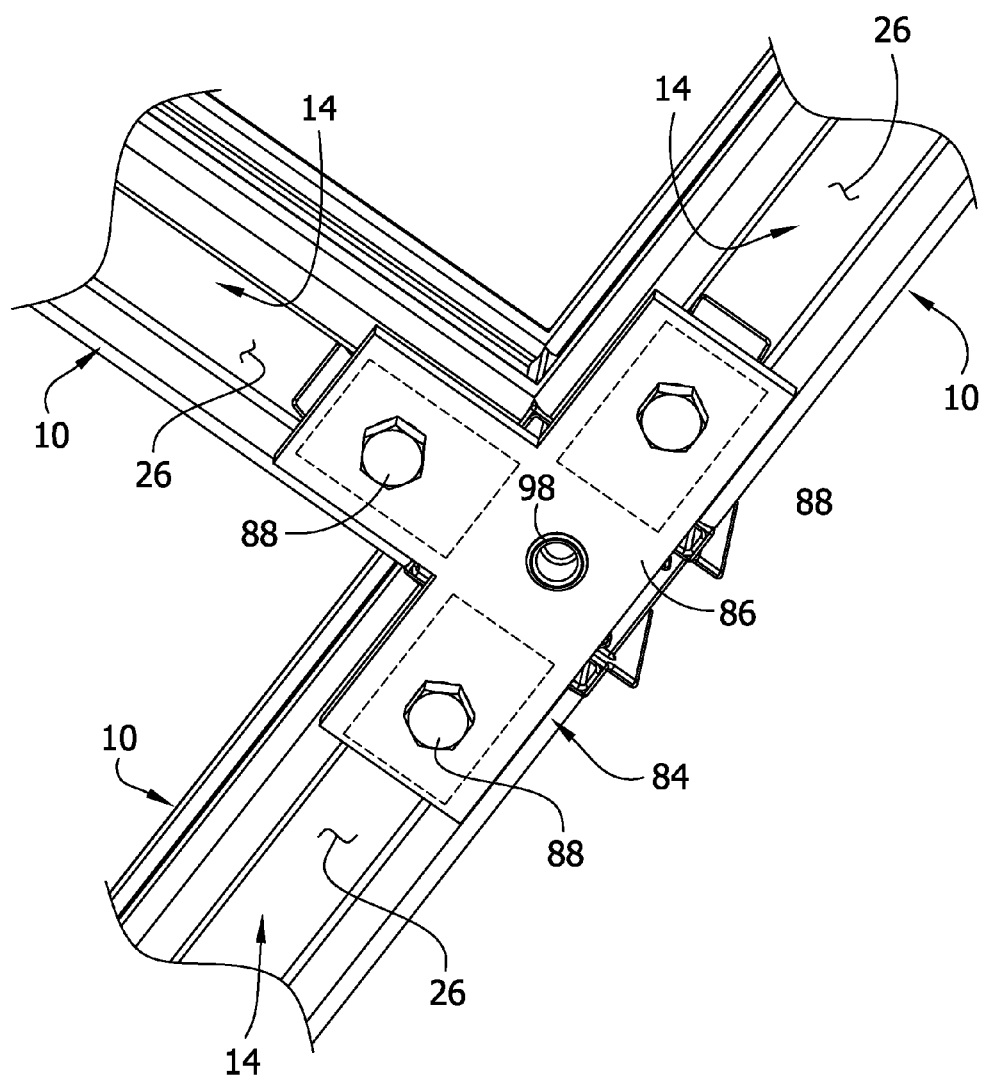
FIG. 11 is a bottom, enlarged perspective of the channel raceway assembly.

Referring to FIGS. 10 and 11, the channel raceway assembly 8 further includes a splice assembly, generally indicated at 84, for interconnecting the joiner 6 and the pieces of channel framing 10. The splice assembly 84 includes a splice plate 86 that is attached to each piece of channel framing 10 by a bolt 88 and a channel framing nut 90 (broadly, mating fasteners). The splice plate 86 may be formed from metal, such as steel or aluminum, or other materials. In the illustrated embodiment, the channel framing nut 90 has a dovetail sectional shape and is slidably receivable in the lower dovetail external grooves 26 of the channel framing 10, though the open longitudinal ends of the grooves. The illustrated nut 90 defines a threaded fastener opening 92 (e.g., a threaded through opening) extends through the top and bottom of the nut in a direction generally transverse (e.g., orthogonal) to the length of the nut. The illustrated nut 90 is disclosed in U.S. patent application Ser.

No. 14/581,588, filed Dec. 23, 2014, the entirety of which is hereby incorporated by reference. Other nuts may be used, including those nuts disclosed in the patent application that is incorporated by reference herein. The splice plate 86 has one or more through openings 94 that are alignable with the threaded fastener openings 92 of the respective nuts 90 when the nut is received in the lower groove 26 of one of the pieces of channel framing 10. The bolts 88 are inserted through the respective splice plate openings 94 and threaded into the threaded fastener openings 92 of the respective nuts 90 to attach the splice plate 86 to the respective piece of channel framing 10. Other ways of attaching the splice plate 86 to the pieces of channel framing 10 do not depart from the scope of the present invention.

Referring to FIGS. 5, 10, and 11, the splice plate 86 is attached to the joiner 6 (more specifically, to the joiner body 50) by a snap-fit connection. The illustrated snap-fit connection is an annular snap joint, although other types of snap-fit connection may be used. A snap-fit component on the lower or under side of the base 56 is mateable by snap-fit connection to the splice plate 86. In the illustrated embodiment, the snap-fit component is a male snap-fit component, and more particularly, an annular snap-fit projection 96, having a resiliently deflectable annular bead 98 adjacent its free end, extending downward from the lower side of the base 56. To attach the splice plate 86 to the joiner 6, the annular bead 98 of the snap-fit projection 96 is passed through a snap-fit opening 100 in the splice plate. The bead 98 resiliently deflects as it enters the snap-fit opening 100, and then resiliently rebounds when it passes through the snap-fit opening and clears the lower surface of the splice plate, as shown in FIG. 11. Once through the snap-fit opening 100, the annular bead 98 resists or inhibits disconnection of the joiner 6 and splice plate 86. This snap-fit connection may be inseparable (meaning the connection must break to be disconnected) or separable (meaning some amount of force will resiliently deflect the annular bead 98 to allow the snap-fit projection 96 to be withdrawn from the snap-fit opening 100). In other embodiments, the snap-fit component on the lower or under side of the base 56 may be a female snap-fit component for receiving a male snap-fit component on the splice plate. The splice plate 86 may be attached to the joiner 6 in other ways, including other types of snap-fit connections, without departing from the scope of the present invention.

The joiner body 50 may be formed as a single piece such that the joiner body is integrally formed as a one-piece construction. The joiner body 50 may be formed from a plastic material, such as UL-94 V-0 rated plastic (referred to as "plenum rated" plastic). As an example, the plastic material may be polyamide 66/6 or other plastic, and the joiner body 50 may be formed by an injection molding process. As another example, the plastic material may be ULTEM 9085, which is a flame retardant thermoplastic available from Stratasys Ltd., and the joiner body may be formed by a 3D printing (also known as additive manufacturing) process. The joiner body 50 may be formed from other materials, including metal, and may be formed in other ways without departing from the scope of the present invention. The joiner wall panel 52 may be formed from the same or different material as the joiner body 50. The joiner wall panel 52 may be formed separately from the joiner body 50. The joiner wall panel 52 may be formed by a molding process such that the joiner wall panel is integrally formed as a one-piece construction. The joiner wall panel 52 may be formed from other materials, including metal, and may be formed in other ways without departing from the scope of the present invention.

As disclosed above, the joiner 6 is configurable to different configurations (e.g., elbow joiner, tee joiner, and cross joiner) for connecting two, three, or four pieces of channel framing 10. In one method, a plurality of joiner bodies 50 and a plurality of joiner wall panels 52 may be delivered to the job site (or another location) with the joiner bodies being separated from (i.e., unconnected from) the joiner wall panels. That is, the joiners 6 are sold and/or delivered in unassembled states. In another embodiment, the joiners 6 may be sold and/or delivered in their desired configurations (i.e., pre-assembled). In yet another embodiment, the joiners 6 may be sold and/or delivered with one or more of the joiner wall panels 52 removably attached or connected to joiner bodies 50 such that one or more joiner wall panels may be removed from each joiner body and/or one or more joiner wall panels may be connected to the body to configure the joiner in the desired configuration. For example, the illustrated joiner 6 may be sold and/or delivered with four, three, two, or one of the joiner wall panels 52 removably attached to the joiner body 50. One or more selective joiner wall panels 52 may be removed by resiliently deflecting the snap-fit projection 80 on the selected joiner wall panel. The pieces of the channel framing 10 (each may be of the same type), the channel framing nuts 90 (each may be of the same type), and the bolts (each may be of the same type) may also be sold and/or delivered or otherwise provided. Different types of splice plates 86 may be sold and/or delivered or otherwise provided, suitable for use with the different configurations of the joiner 6. Essentially, the types of splice plates 86 will have different shapes (e.g., elbow, tee and cross shapes) corresponding to the shape of the desired joiner configuration.

In one example, a worker (at the job site or prior to delivery to the job site) configures each joiner 6 according to the type of joiner needed either by connecting one or more joiner wall panels 52 to the joiner body 50 (to make either an elbow joiner, or tee joiner) or by leaving the joiner body unconnected to any joiner wall panels (to make a cross joiner). In the channel raceway assembly 8 shown in FIG. 1, the joiner 6 is configured as a tee joiner. Thus, in this illustrated example, a single joiner wall panel 52 is connected to the joiner body 50, such that the space above the three sides 58a, 58b, 58d of the base 56 remain open. Three pieces of channel framing 10 are connected to the respective three open sides of the joiner body 50 by inserting the three pairs of connecting projections 64a, 64b, 64d into the corresponding channel framing tracks 44, 46 of the pieces of channel framing and using the splicing assembly 84, in the manner disclosed above herein, to interconnect the joiner 6 and the three pieces of channel framing. The connecting projections 64a, 64b, 64c, 64d may be sized and shaped to be snugly received in the channel framing tracks 44, 46 to create a press-fit connection between the connecting projections and the pieces of channel framing 10. With the connecting projections 64a, 64b, 64d received in the respective channel framing tracks 44, 46, the corresponding longitudinal ends of the pieces of channel framing 10 are in substantially flush engagement with the corresponding posts 64a, 64c, 64d. Wires and/or cables are run through in the interiors 22 of the pieces of channel framing 10 and the interior of the joiner 6, such as in a method generally known in the art. Conventional covers (not shown) may be attached to the upper sides 12 of the pieces of channel framing 10 to close the open slot 19 after laying the wires and/or cables in the interior of the channel raceway assembly 8. The covers may extend over the open top of the joiner 6 or a joiner cap (not shown) attachable to the joiner may be used. The assembled channel raceway assembly 8 defines a fully enclosed interior, with the interior of the pieces of channel framing 10 being in communication with one another. In particular, the assembled channel raceway assembly 8 has no gaps greater than 1/16" throughout the run. Moreover, the assembly 8 maintains electrical continuity at all points, and is free of internal sharps.

Figure 12:
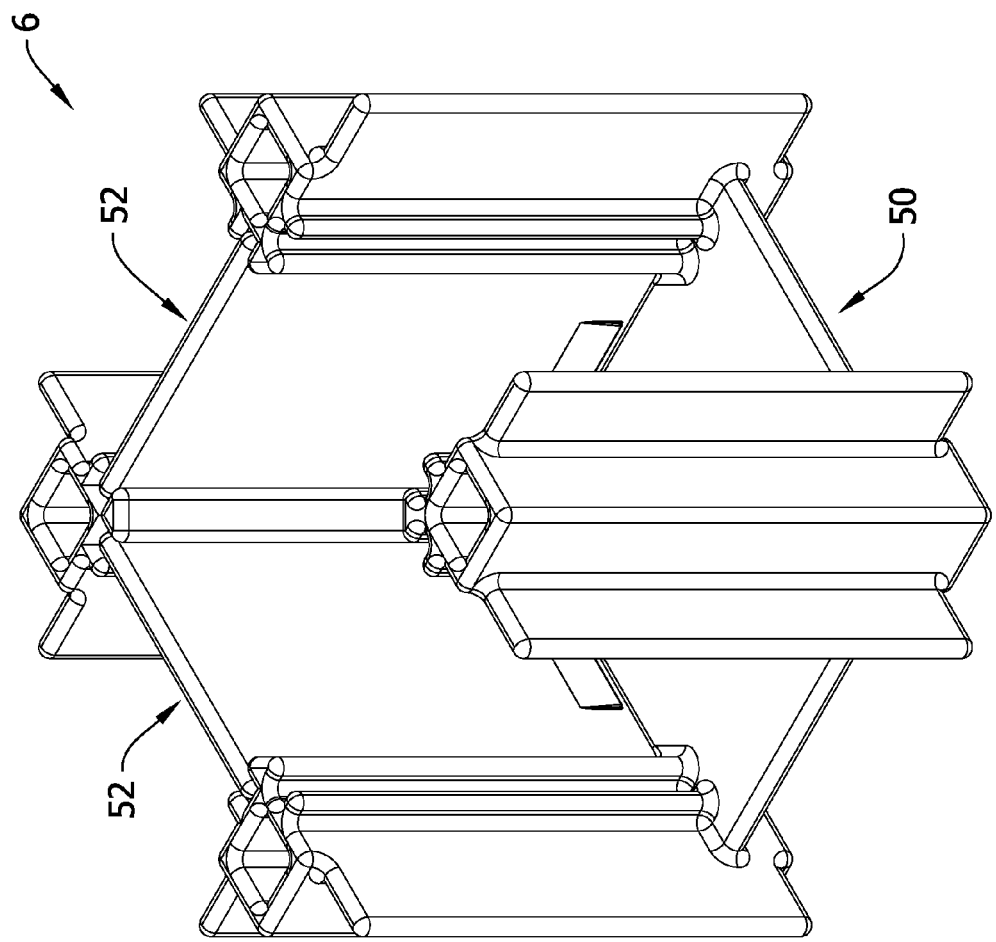
FIG. 12 is a perspective of the joiner of the present disclosure configured as an elbow joiner.

Other configurations of the joiner 6 are shown in FIGS. 4 and 12. FIG. 4 illustrates the joiner 6 configured as a cross joiner, where no joiner wall panels 52 are attached to the joiner body 50. FIG. 12 illustrates the joiner 6 configured as an elbow joiner, where two joiner wall panels 52 are attached to the joiner body 50. Using these configurations of the joiner to form different channel raceway assembly is readily apparent from the disclosure set forth above herein. It can also be seen that the joiner may be constructed to be configured in other configurations.

Figure 13:
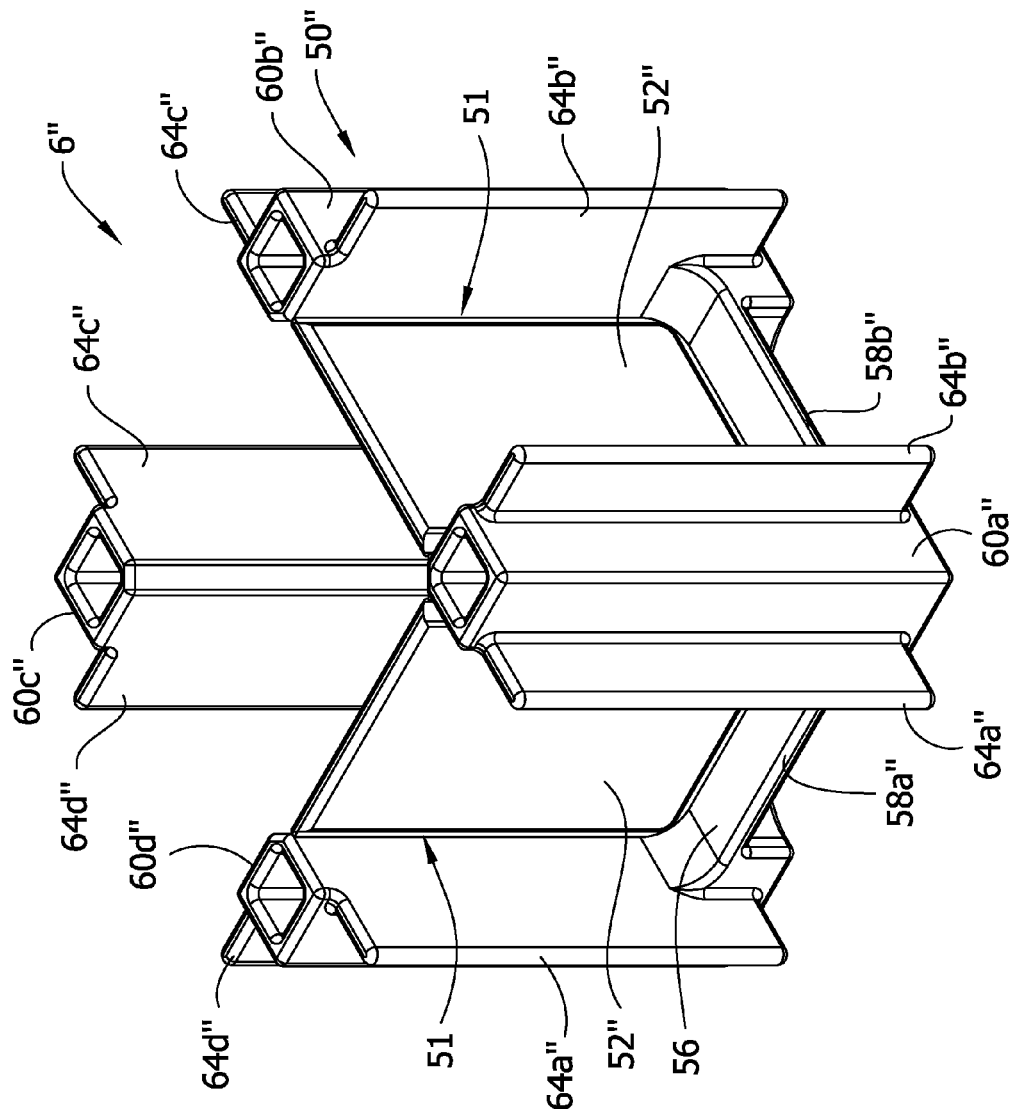
FIG. 13 is another embodiment of a joiner of the present disclosure.

Referring to FIG. 13, another embodiment of a joiner for use in assembling a channel raceway assembly is generally indicated at 6". Unless otherwise described below, this joiner 6" is similar to the embodiment described above, with similar components being indicated by the same reference numeral plus a prime symbol. Like the previous embodiment, the joiner body 50" includes posts 60a", 60b", 60c", 60d" extending upward from base 56", and pairs of connecting projections 64a", 64b", 64c", 64d". The main difference between the present joiner 6" and the prior joiner 6 is that the one or more joiner wall panels 52" (e.g., two walls) of the present joiner is attached to the joiner body 50" by frangible connection, generally indicated at 51. The frangible connection 51 may be a line or area of weakness, which may be defined by a thinned area of material (as illustrated) and/or perforations and/or openings. This frangible connection 51 is capable of being broken and/or cut to allow the selective removal of one or more of the joiner wall panels 52". Thus, removal or non-removal of selective walls 52" allows the joiner 6" to be configurable into a select one of a plurality of different configurations (e.g., elbow joiner, tee joiner, and cross joiner). As with the prior joiner 6, the present joiner may be configurable to additional configurations. The present joiner 6" may be used in the same manner as the first joiner 6 to assemble the channel raceway assembly.

Having described embodiments of the invention in detail, it will be apparent that modifications and variations are possible without departing from the scope of the invention defined in the appended claims.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A joiner system for a channel raceway, the joiner system comprising:

a joiner body including a base and first and second posts extending upward from the base, wherein the first and second posts are spaced apart from one another and in generally opposing relationship with respect to one another, wherein the first and second posts and the base together define an open side of the joiner body; and a joiner wall panel separate from the joiner body, wherein the joiner body and the joiner wall panel are configured to facilitate selective connection of the joiner wall panel to the joiner body between the first and second posts, wherein the joiner wall panel is sized and shaped to close the open side of the joiner body when the joiner wall panel is connected to the joiner body between the first and second posts, wherein the joiner body includes a wall panel track extending upward from the base and sized and shaped to slidably receive the joiner wall panel therein to facilitate said selective connection of the joiner wall panel to the joiner body, wherein the wall panel track includes a first portion connected to and extending along the first post and defining a first groove, and a second portion connected to and extending along the second post and defining a second groove, wherein the joiner wall panel is slidably receivable in the first and second grooves, wherein the base defines a wall panel slot extending through upper and lower sides of the base, the wall panel slot being vertically aligned with the first and second grooves defined by the first and second portions of the wall panel track.

2. The joiner system set forth in claim 1, wherein joiner wall panel includes a panel snap-fit component to facilitate said selective connection of the joiner wall panel to the joiner body.

3. The joiner system set forth in claim 2, wherein the joiner wall panel includes a panel body having opposite faces, wherein the panel snap-fit component is on at least one of the faces of the panel body.

4. The joiner system set forth in claim 3, wherein the panel snap-fit component extends outward from said at least one of the faces of the panel body and is resiliently deflectable.

5. The joiner system set forth in claim 1, wherein the joiner wall panel includes a panel body having opposite upper and lower ends, and at least one foot extending outward from adjacent the lower end of the panel, wherein the at least one foot and sized and shaped to inhibit entry into the wall panel slot.

6. The joiner system set forth in claim 1, wherein the joiner body includes a snap-fit component on the lower side of the base of the joiner body, the snap-fit component configured to mate in a snap-fit connection with a splice plate to interconnect the joiner body and at least two piece of channel framing.

7. The joiner system set forth in claim 1, wherein the joiner body includes first and second connecting projections extending outward from adjacent the respective first and second posts, wherein the first and second connecting projections are spaced apart from one another and in generally opposing relationship with respect to one another.

8. The joiner system set forth in claim 1, wherein the base has a generally rectangular perimeter, and wherein the joiner body includes third and fourth posts, the first, second, third, and fourth posts being disposed adjacent respective corners of the base, wherein the first and third posts and the base define a second open side of the joiner body, the joiner body and the joiner wall panel being configured to facilitate selective connection of the joiner wall panel to the joiner body between the first and third posts, wherein the joiner wall panel is sized and shaped to close the second open side of the joiner body when the joiner wall panel is connected to the joiner body between the first and third posts, wherein the second and fourth posts and the base define a third open side of the joiner body, the joiner body and the joiner wall panel being configured to facilitate selective connection of the joiner wall panel to the joiner body between the second and fourth posts, wherein the joiner wall panel is sized and shaped to close the third open side of the joiner body when the joiner wall panel is connected to the joiner body between the second and fourth posts.

9. The joiner system set forth in claim 1, wherein the splice plate has a T-shape.

10. A joiner system for a channel raceway, the joiner system comprising:

a joiner body including a base and first and second posts extending upward from the base, wherein the first and second posts are spaced apart from one another and in generally opposing relationship with respect to one another, wherein the first and second posts and the base together define an open side of the joiner body; and a joiner wall panel separate from the joiner body, wherein the joiner body and the joiner wall panel are configured to facilitate selective connection of the joiner wall panel to the joiner body between the first and second posts, wherein the joiner wall panel is sized and shaped to close the open side of the joiner body when the joiner wall panel is connected to the joiner body between the first and second posts, wherein the base has a generally rectangular perimeter, wherein the joiner body includes third and fourth posts, the first, second, third, and fourth posts being disposed adjacent respective corners of the base, wherein the first and third posts and the base define a second open side of the joiner body, the joiner body and the joiner wall panel being configured to facilitate selective connection of the joiner wall panel to the joiner body between the first and third posts, wherein the joiner wall panel is sized and shaped to close the second open side of the joiner body when the joiner wall panel is connected to the joiner body between the first and third posts, wherein the second and fourth posts and the base define a third open side of the joiner body, the joiner body and the joiner wall panel being configured to facilitate selective connection of the joiner wall panel to the joiner body between the second and fourth posts, wherein the joiner wall panel is sized and shaped to close the third open side of the joiner body when the joiner wall panel is connected to the joiner body between the second and fourth posts.

11. The joiner system set forth in claim 10, wherein the joiner body includes a wall panel track extending upward from the base and sized and shaped to slidably receive the joiner wall panel therein to facilitate said selective connection of the joiner wall panel to the joiner body.

12. The joiner system set forth in claim 11, wherein the wall panel track includes a first portion connected to and extending along the first post and defining a first groove, and a second portion connected to and extending along the second post and defining a second groove, wherein the joiner wall panel is slidably receivable in the first and second grooves.

13. The joiner system set forth in claim 12, wherein the base defines a wall panel slot extending through upper and lower sides of the base, the wall panel slot being vertically aligned with the first and second grooves defined by the first and second portions of the wall panel track.

* * * * *